United States Patent
Wang et al.

(10) Patent No.: US 11,458,440 B2
(45) Date of Patent: Oct. 4, 2022

(54) THIN-FILM COMPOSITE POLYAMIDE REVERSE OSMOSIS MEMBRANE WITH ANTI-BACTERIAL AND ANTI-BIOFOULING EFFECTS AND PREPARATION METHOD THEREOF

(71) Applicants: Tongji University, Shanghai (CN); Tianjin Polytechnic University, Tianjin (CN)

(72) Inventors: Zhiwei Wang, Shanghai (CN); Yue Wen, Shanghai (CN); Hongwei Zhang, Tianjin (CN); Jie Wang, Tianjin (CN); Yingqing Chen, Shanghai (CN); Zhichao Wu, Shanghai (CN)

(73) Assignees: TONGJI UNIVERSITY, Shanghai (CN); TIANJIN POLYTECHNIC UNIVERSITY, Tianjin (CN)

( * ) Notice: Subject to any disclaimer, the term of this patent is extended or adjusted under 35 U.S.C. 154(b) by 249 days.

(21) Appl. No.: 16/882,752

(22) Filed: May 26, 2020

(65) Prior Publication Data
US 2021/0060497 A1    Mar. 4, 2021

(30) Foreign Application Priority Data
Aug. 28, 2019   (CN) .......................... 201910800034.1

(51) Int. Cl.
| | | |
|---|---|---|
| *B01D 69/12* | (2006.01) | |
| *B01D 61/02* | (2006.01) | |
| *B01D 65/08* | (2006.01) | |
| *B01D 67/00* | (2006.01) | |
| *B01D 69/02* | (2006.01) | |
| *B01D 71/56* | (2006.01) | |
| *C02F 1/44* | (2006.01) | |
| *C07F 1/08* | (2006.01) | |

(52) U.S. Cl.
CPC ......... *B01D 69/125* (2013.01); *B01D 61/025* (2013.01); *B01D 65/08* (2013.01); *B01D 67/0006* (2013.01); *B01D 69/02* (2013.01); *B01D 71/56* (2013.01); *C02F 1/441* (2013.01); *C07F 1/08* (2013.01); *B01D 2325/20* (2013.01); *B01D 2325/48* (2013.01)

(58) Field of Classification Search
CPC ...... B01D 71/56; B01D 61/025; B01D 69/10; B01D 61/145; B01D 2253/204
See application file for complete search history.

(56) References Cited

FOREIGN PATENT DOCUMENTS

| CN | 106474945 A | 3/2017 |
|---|---|---|
| CN | 106823834 A | 6/2017 |
| CN | 109012240 A | 12/2018 |

OTHER PUBLICATIONS

McDonald et al. "Enhanced carbon dioxide capture upon incorporation of N,N0-dimethylethylenediamine in the metal-organic framework CuBTTri" Chem. Sci. 2011, 2, 2022-2028. (Year: 2011).*
Gu et al., "Metal-Organic Frameworks (MOFs)-boosted filtration membrane technology for water sustainability" APL Mater. 8, 040902, 2020. (Year: 2020).*
Wen et al. "Thin-film nanocomposite membranes incorporated with water stable metalorganic framework CuBTTri for mitigating biofouling" Journal of Membrane Science, 582, 2019, p. 289-297. (Year: 2019).*
Yue Wen, et al., Thin-film nanocomposite membranes incorporated with water stable metal-organic framework CuBTTri for mitigating biofouling, Journal of Membrane Science 582, 2019, pp. 289-297.

* cited by examiner

*Primary Examiner* — Ryan B Huang
(74) *Attorney, Agent, or Firm* — Bayramoglu Law Offices LLC

(57) ABSTRACT

A thin-film composite polyamide reverse osmosis membrane with anti-bacterial and anti-biofouling effects and a preparation method thereof are disclosed. The preparation method includes: dissolving a highly water-stable metal organic framework CuBTTri in an n-hexane solution containing trimesoyl chloride by ultrasonic wave, immersing a polyethersulfone ultrafiltration membrane in an aqueous solution of m-phenylene diamine and taking out, and then immersing the ultrafiltration membrane in the trimesoyl chloride-n-hexane solution containing the aforementioned metal organic framework for reaction and modification, so as to obtain the thin-film composite polyamide reverse osmosis membrane. The resulting composite reverse osmosis membrane integrated with the anti-bacterial metal organic framework CuBTTri has a high reverse osmosis membrane permeability and possesses greatly improved and persistent anti-bacterial and anti-biofouling properties. The preparation method is simple and conducive to promotion, and has mild conditions.

12 Claims, 5 Drawing Sheets

| No. | Cu wt.% | No. | Cu wt.% |
|---|---|---|---|
| S1 | 3.91 | S2 | 3.72 |
| S3 | 3.04 | S4 | 3.65 |
| S5 | 4.19 | S6 | 3.44 |

THIN-FILM COMPOSITE POLYAMIDE REVERSE OSMOSIS MEMBRANE WITH ANTI-BACTERIAL AND ANTI-BIOFOULING EFFECTS AND PREPARATION METHOD THEREOF

CROSS REFERENCE TO THE RELATED APPLICATIONS

This application is based upon and claims priority to Chinese Patent Application No. 201910800034.1, filed on Aug. 28, 2019, the entire contents of which are incorporated herein by reference.

TECHNICAL FIELD

The present invention relates to a thin-film composite polyamide reverse osmosis membrane with anti-bacterial and anti-biofouling effects and a preparation method thereof. The present invention belongs to the field of water treatment science and technology.

BACKGROUND

Membrane separation technology is a new and efficient separation technology, which has the advantages of rapid separation and simple operation. It has been applied in many fields, and plays very key roles especially in sewage treatment, water reuse and seawater desalination. A thin-film composite polyamide membrane has high stability and mechanical strength, good chemical resistance and high separation properties, and is therefore widely used in reverse osmosis membrane separation fields. However, during the application process of the thin-film membrane separation technology, membrane fouling, especially biofouling, is a main factor that prevents thin-film composite membrane technology from further promotion. Membrane fouling will reduce membrane permeability, and the fouled membrane needs to be regularly cleaned, which increases the costs of membrane operation and water output. Therefore, it has become a hot topic in the field of membrane preparation to study and prepare membranes with anti-bacterial and anti-fouling properties, so as to improve the anti-fouling properties of the membranes, and prolong the service life of the membranes.

At present, there are a lot of reports on the anti-fouling modification of a thin-film composite polyamide membrane. Among them, introducing inorganic anti-bacterial agents, especially some nanomaterials with anti-bacterial properties, on the membrane surface has attracted extensive attention from researchers in the field of anti-biofouling thin-film composite membrane preparation, because these anti-bacterial agents are highly effective and are safe broad-spectrum anti-bacterial agents. For example, in the patent application CN106474945A, the polyamide membrane after hydrophilic treatment is immersed in the organic-aqueous solution containing nano silver, and the nano silver is introduced into the surface of the polyamide functional layer by microwave heating, so as to realize the highly efficient composition of the anti-bacterial agent silver nanoparticles and the polyamide membrane to improve the anti-bacterial properties of the membrane. In the patent application CN109012240A, by introducing silver nitrate and a stabilizer, 3-aminopropyl trimethoxysilane (APS), into the casting solution, silver nanoparticles are inserted into the porous support layer, and then an anti-fouling composite membrane is prepared by interfacial polymerization. In the patent application CN106823834A, an anti-bacterial and anti-biofouling layer is formed by cross-linking after coating the surface of the polyamide separation layer with a mixed solution of an anti-bacterial guanidine polymer, silver nitrate and polyvinyl alcohol. However, the above-mentioned modification methods mostly rely on the release of nanomaterials to kill bacteria. The anti-bacterial agent is easily released, leading to the loss of anti-bacterial activity and environmental pollution. In addition, the modification methods described above are complicated, inefficient and disadvantageous for commercial production.

As a porous material newly discovered in recent years, the metal organic framework material has characteristics of high porosity, adjustable pore structure, large specific surface area, and good compatibility with polymers, and has great application potential in the preparation of high permeability membranes. CuBTTri is a highly water-stable metal organic framework formed by metal copper and a nitrogen ligand through ligand bridging, which has higher stability and anti-fouling efficiency than other metal/metal oxide nanomaterials. Meanwhile, the desirable pore structure of CuBTTri can increase the permeability of the membrane without reducing the selectivity of the membrane.

SUMMARY

The main objective of the present invention is to provide use of the metal framework compound CuBTTri in water treatment. The CuBTTri has a molecular formula of $H_3[(Cu_4Cl)_3-(BTTri)_8]$ and a structural formula of

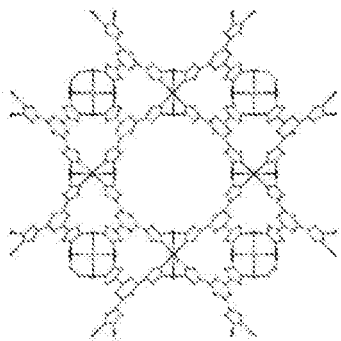

, and the backbone of the CuBTTri includes $Cu^{2+}$ and an organic ligand $H_3BTTri$, where the $H_3BTTri$ is 1,3,5-tri(1H-1,2,3-triazol-5-yl)benzene, and has a structural formula of

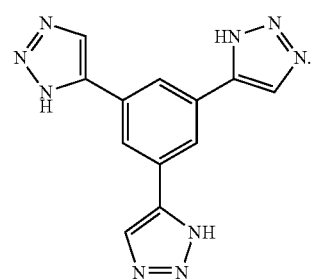 [SMILES: c1c(-c2cnn[nH]2)cc(-c2cnn[nH]2)cc1-c1cnn[nH]1]

Another objective of the present invention is to provide a thin-film composite polyamide reverse osmosis membrane with anti-bacterial and anti-biofouling effects. An ultrafiltration membrane is used as a substrate, and an aromatic polyamide containing CuBTTri loaded on the surface of the substrate is used as a thin filmthin film, in order to improve the anti-bacterial and anti-biofouling properties of the reverse osmosis membrane, prevent the membrane permeability from remarkably decreasing during use, reduce operating cost and energy consumption, and prolong the service life of the membrane.

A further objective of the present invention is to provide a method for preparing the above-mentioned thin-film composite polyamide reverse osmosis membrane, including: dissolving CuBTTri in an organic solvent and stably loading CuBTTri into a polyamide thin layer by interfacial polymerization; and forming a thin film on the surface of an ultrafiltration membrane, so as to obtain a thin-film composite polyamide reverse osmosis membrane with anti-bacterial and anti-biofouling properties. The method has simple steps and is easy to control.

A further objective of the present invention is to provide use of the above-mentioned thin-film composite polyamide reverse osmosis membrane in water treatment. The reverse osmosis membrane can stably and effectively perform sterilization and inhibit the adhesion and deposition of bacteria on the membrane surface, and has a significant long-term anti-fouling effect.

The foregoing objectives of the present invention are achieved through the following technical solutions.

In a first aspect, the present invention provides use of CuBTTri in water treatment. The CuBTTri has a molecular formula of $H_3[(Cu_4Cl)_3-(BTTri)_8]$ and a structural formula

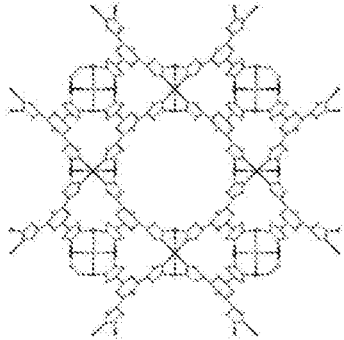

of , and the backbone of the CuBTTri mainly consists of $Cu^{2+}$ and an organic ligand $H_3BTTri$, where the $H_3BTTri$ has a system name of 1,3,5-tri(1H-1,2,3-triazol-5-yl)benzene and a structural formula of

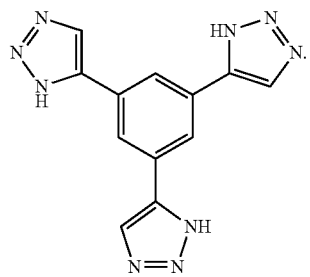 [SMILES: c1c(-c2cnn[nH]2)cc(-c2cnn[nH]2)cc1-c1cnn[nH]1]

Further, bacteria in water may die when in contact with copper, the active center of the CuBTTri, so that sterilization can be achieved and bacterial growth can be inhibited.

In a second aspect, the present invention provides a thin-film composite polyamide reverse osmosis membrane with anti-bacterial and anti-biofouling effects, wherein an ultrafiltration membrane is used as a substrate, and an aromatic polyamide film containing the CuBTTri loaded on the surface of the substrate is used as a thin film.

Further, the ultrafiltration membrane is a polyacrylonitrile membrane, a polysulfone membrane or a polyethersulfone membrane, and has a molecular weight cutoff of 10-20 kDa.

In a third aspect, the present invention provides a method for preparing the thin-film composite polyamide reverse osmosis membrane, including the steps of:

i) synthesizing the CuBTTri, including the steps in order of:

a) dissloving $CuCl_2.2H_2O$ in an organic solvent to obtain a copper chloride solution having a mass concentration of 3.8%-5.7%;

b) dissloving $H_3BTTri$ in an organic solvent, and adding HCl dropwise to acidify to pH 3.0-4.5, to obtain a triazole solution having a mass concentration of 0.5%-1%;

c) mixing the solutions prepared in steps a) and b) in a volume ratio of 1:(2-3) and reacting at 70-100° C. for 48-96 h; and d) centrifuging the resultant obtained in step c) at 7500-8500 rpm for 5-10 min to obtain a purple precipitate, and vacuum drying for 12-24 h to obtain the CuBTTri;

ii) preparing an aqueous solution of m-phenylene diamine having a mass concentration of 1.5%-2.5%;

iii) ultrasonic dispersing the CuBTTri obtained in step i) in a trimesoyl chloride/n-hexane solution having a mass concentration of 0.1%-0.15%, to obtain an n-hexane solution of CuBTTri having a mass concentration of 0.05%-0.2%;

iv) first immersing the ultrafiltration membrane in the aqueous solution of m-phenylene diamine obtained in step ii) to react for 1-2 min and taking out, and removing the aqueous solution of m-phenylene diamine on the membrane surface; and then immersing the ultrafiltration membrane in the n-hexane solution of CuBTTri obtained in step iii) to react for 30-60 s, forming a thin film on the surface of the ultrafiltration membrane by an interfacial polymerization, and removing unreacted trimesoyl chloride on the membrane surface by cleaning with adequate hexane; and v) heat-treating the composite membrane obtained in step iv) at 50-80° C., and then immersing the composite membrane in deionized water at 4° C. for at least 24 h.

Further, the organic solvent in step i) is N,N-dimethylformamide, tetrahydrofuran or N-methyl pyrrolidone.

Further, the immersion manner in step iv) is full immersion and the orientation of the membrane surface of the ultrafiltration membrane is upward.

In a fourth aspect, the present invention provides use of the thin-film composite polyamide reverse osmosis membrane in water treatment.

Further, bacteria in water are brought into contact with the CuBTTri when bacteria contact the surface which is uniformly loaded with the aromatic polyamide film containing the CuBTTri, and copper, the active center of the CuBTTri, can kill the bacteria, so that sterilization is achieved and bacterial growth is inhibited.

Compared with the prior art, in the present invention, the highly water-stable metal organic framework CuBTTri is dissolved in the organic solution for preparing the membrane and introduced into the substrate through interfacial polymerization, so that the membrane is successfully integrated with anti-bacterial function, thereby improving the anti-bacterial and anti-biofouling properties of the membrane. The present invention has the following advantages:

(1) The anti-bacterial agent is loaded by the non-covalent bonding between the organic ligand of the metal organic framework and the polyamide matrix, so as to form stable adhesion of the anti-bacterial agent on the membrane, and the anti-bacterial and anti-biofouling properties are efficient and durable.

(2) The modified thin-film composite polyamide reverse osmosis membrane has desirable anti-bacterial properties, significant sterilization and anti-adhesion effects. Compared with other metal nanomaterials, the metal active center of metal organic frameworks is strongly stabilized by organic linker, which makes it difficult to release. As a result, the membrane has durable anti-fouling properties and long service life, and is environmentally friendly.

(3) The copper-metal organic framework can kill bacteria once contacting, realizing broad-spectrum and highly effective bacteriostasis.

(4) As a novel porous material, the metal organic framework has a desirable pore structure, which can increase the permeability of the membrane without compromising the selectivity of the membrane, and has great application prospects in the modification of thin-film composite polyamide membrane.

(5) The conditions for preparing the membrane are mild and controllable, and the operations of the preparation are simple and do not need expensive equipment, thus the membrane is conducive to industrialization.

DETAILED DESCRIPTION OF THE EMBODIMENTS

In order to make the objectives, technical solutions, and advantages of the present invention clearer, the present invention will be described in further detail below in conjunction with the drawings and specific embodiments. It should be understood that the specific embodiments described herein are only intended to explain the present invention, not to limit the present invention.

Embodiment 1

Figure 1:
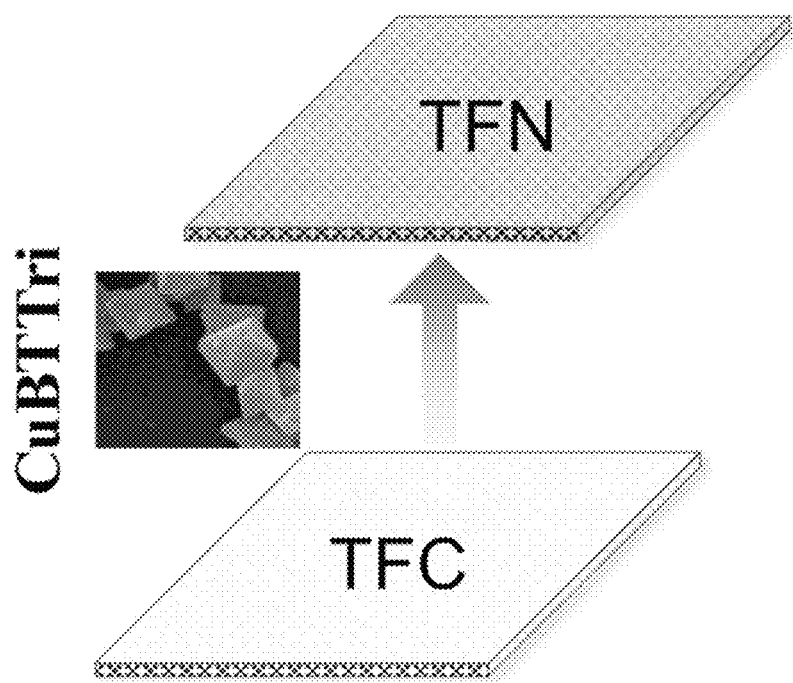
FIG. 1 is a graph showing the preparation process and the product structure of a thin-film composite polyamide reverse osmosis membrane of the present invention.
Figure 2A:
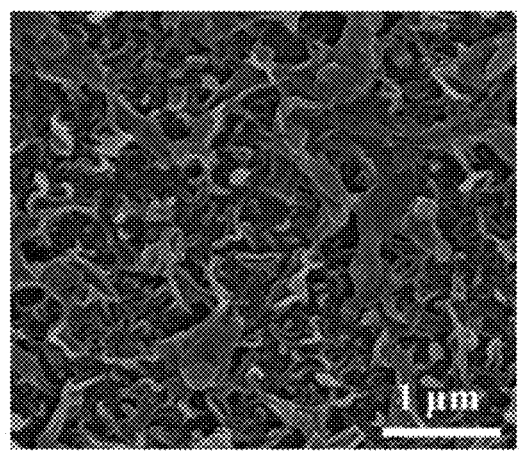
FIG. 2A-FIG. 2D show scanning electron microscope (SEM) images of the TFC, TFN-1, TFN-2 and TFN-3 membranes obtained in Embodiment 1.
Figure 2B:
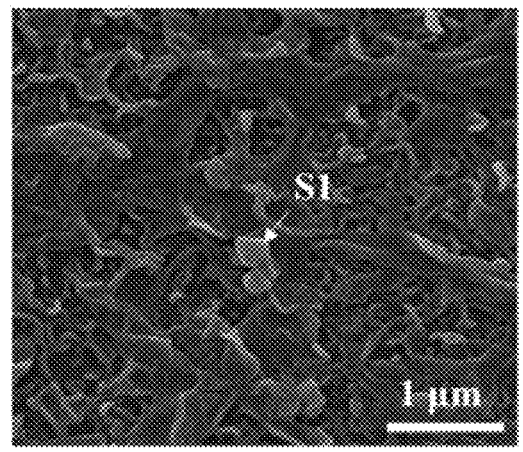
Figure 2C:
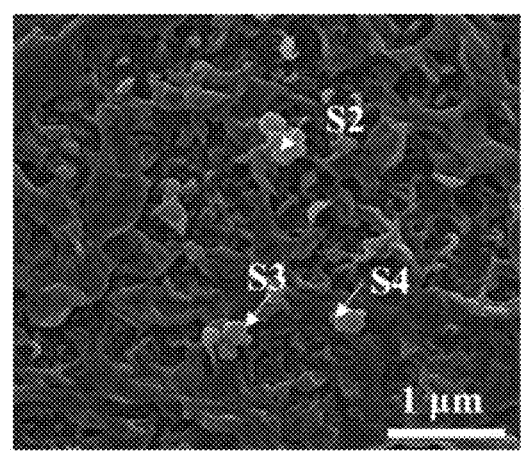
Figure 2D:
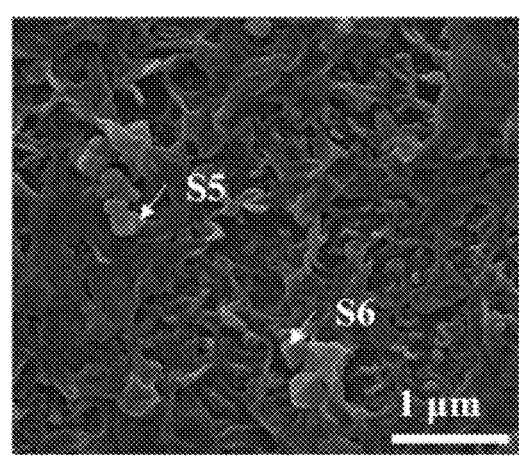
Figures 2E, 3:
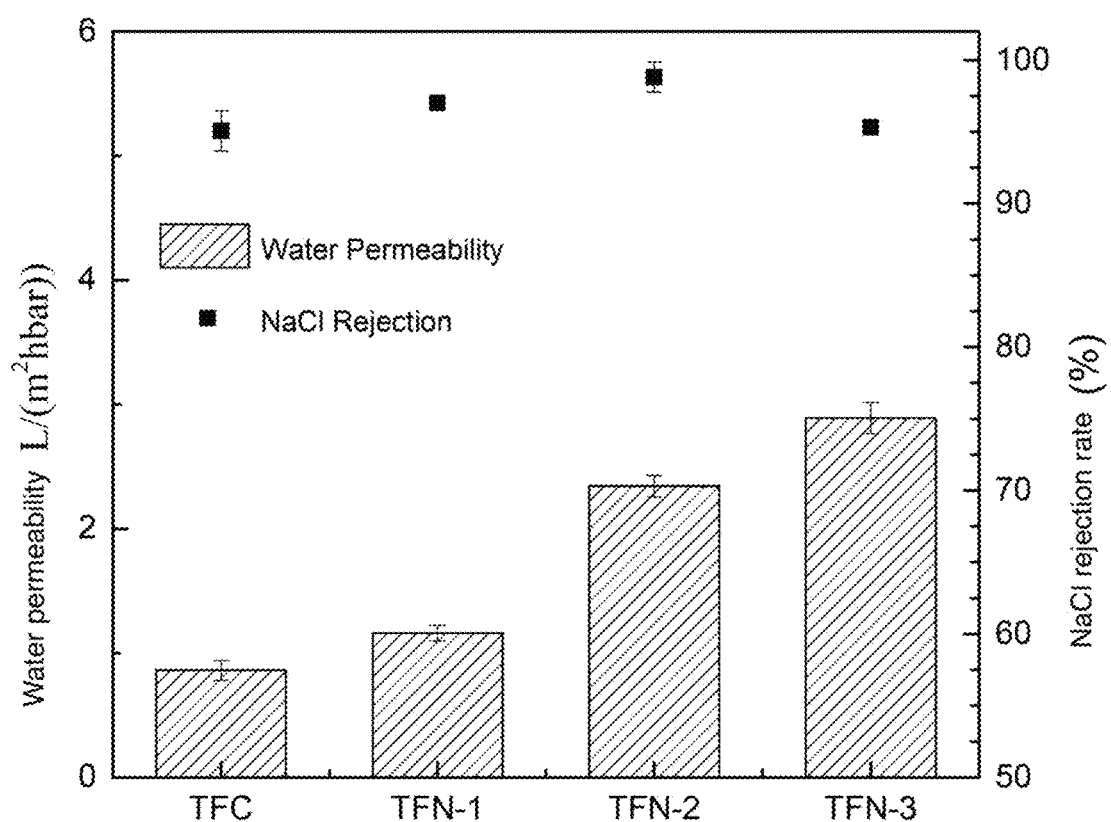
FIG. 2E shows the CuBTTri distribution.
FIG. 3 is a graph showing the separation performance of the membranes TFC, TFN-1, TFN-2 and TFN-3 obtained in Embodiment 1.

$CuCl_2 \cdot 2H_2O$ (383 mg) was dissolved in 15 mL N,N-dimethylformamide to obtain a copper chloride solution. $H_3BTTri$ (150 mg) was dissolved in 30 mL N,N-dimethylformamide to obtain a triazole solution, and the triazole solution was acidified to pH 3.0-4.5 by adding HCl dropwise. The copper chloride solution and the acidified triazole solution were sufficiently mixed and reacted at 90° C. for 72 h after ultrasonic treatment for 10 min to obtain a metal organic framework CuBTTri. The CuBTTri was centrifuged at 8000 rpm for 8 min to obtain a purple precipitate, and then vacuum dried for 12 h. The resulting CuBTTri was Soxhlet extracted by deionized water for 24 h, and the organic solvent residual in the CuBTTri framework was removed. An m-phenylene diamine solution was dissolved in deionized water with a mass concentration of 2%. A 20 kDa polyethersulfone ultrafiltration membrane was used as a substrate, and the substrate was immersed in the m-phenylene diamine solution to react at 25° C. for 2 min and then taken out. An excessive m-phenylene diamine solution on the surface of the ultrafiltration membrane was blown away by nitrogen. Trimesoyl chloride was dissolved in n-hexane with a mass concentration of 0.1%. The resulting CuBTTri was dissolved in the trimesoyl chloride-n-hexane solution, and mass concentrations of CuBTTri were respectively 0.00%, 0.05%, 0.10% and 0.20%. An ultrasonic dispersion was performed for 45 min. The membrane was immersed in the n-hexane solutions of different CuBTTri concentrations to react at 25° C. for 45 s, and then an aromatic polyamide layer was formed by interfacial polymerization. The unreacted trimesoyl chloride solution on the membrane surface was removed using excessive n-hexane. The membrane was heat-treated at 70° C. for 5 min, to obtain a thin-film composite polyamide reverse osmosis membrane containing CuBTTri (denoted as TFC, TFN-1, TFN-2 and TFN-3, respectively). The membranes then were immersed in deionized water at 4° C. for at least 24 h for use, referring to FIG. 1.

Embodiment 2

$CuCl_2 \cdot 2H_2O$ (383 mg) was dissolved in 15 mL N,N-dimethylformamide to obtain a copper chloride solution. $H_3BTTri$ (225 mg) was dissolved in 45 mL N,N-dimethylformamide to obtain a triazole solution, and the triazole solution was acidified to pH 3.0-4.5 by adding HCl dropwise. The copper chloride solution and the acidified triazole solution were sufficiently mixed and reacted at 90° C. for 72 h after ultrasonic treatment for 10 min to obtain a metal organic framework CuBTTri. The CuBTTri was centrifuged at 8000 rpm for 8 min to obtain a purple precipitate, and vacuum dried for 12 h. The resulting CuBTTri was Soxhlet extracted by deionized water for 24 h, and the organic solvent residual in the CuBTTri framework was removed. An m-phenylene diamine solution was dissolved in deionized water with a mass concentration of 2%. A 10 kDa polysulfone ultrafiltration membrane was used as a substrate, and the substrate was immersed in the m-phenylene diamine solution to react at 25° C. for 2 min and then taken out. An excessive m-phenylene diamine solution on the surface of the ultrafiltration membrane was blown away by nitrogen. Trimesoyl chloride was dissolved in n-hexane with a mass concentration of 0.1%. The resulting CuBTTri was dissolved in the trimesoyl chloride-n-hexane solution, and mass concentrations of CuBTTri were respectively 0.00%, 0.05%, 0.10% and 0.20%. An ultrasonic dispersion was performed for 45 min. The membrane was immersed in the n-hexane solutions of different CuBTTri concentrations to react at 25° C. for 45 s, and then an aromatic polyamide layer was formed by interfacial polymerization. The unreacted trimesoyl chloride solution on the membrane surface was removed using excessive n-hexane. The membrane was heat-treated at 70° C. for 5 min to obtain a thin-film composite polyamide reverse osmosis membrane containing CuBTTri (denoted as TFC, TFN-1, TFN-2 and TFN-3, respectively). The membranes then were immersed in deionized water at 4° C. for at least 24 h for use.

Embodiment 3

Membrane surface morphology test: the composite membranes obtained in Embodiment 1 were tested for the surface topography and the CuBTTri distribution by SEM-(energy dispersive x-ray) EDX, as shown in FIG. 2A-FIG. 2E. According to the test, the membranes TFC, TFN-1, TFN-2 and TFN-3 obtained in Embodiment 1 all presented a "ridge-valley" structure which was typical in reverse osmosis (RO) membranes, illustrating that the addition of CuBTTri did not significantly change the formation of the polyamide membrane, and CuBTTri and the polyamide membrane had high compatibility.

Embodiment 4

Water permeability test: the membranes obtained in Embodiment 1 were chosen to carry out cross-flow filtration by a reverse osmosis cell under conditions of 1.6 MPa and 24° C. The effective membrane area was 20.02 cm$^2$, the cross-flow rate was 22.0 cm/s, and the inflow was deionized water. The water permeability was recorded and calculated. The water permeability was defined as, under certain operating conditions, the volume of water permeating a unit membrane area in unit pressure and unit time, and the unit of the water permeability was L/(m$^2$hbar). After the test was completed, the salt rejection rate was tested under the same conditions with 2000 mg/L NaCl solution as inflow. The salt rejection rate was equal to the difference between the salt concentration in the feed and permeatedivided by the salt concentration in the feed under certain operating conditions. The results were shown in FIG. 3.

According to the test, the water permeability of the membranes TFN-1, TFN-2 and TFN-3 obtained in Embodiment 1 was significantly higher than the original membrane TFC, and increased with the increase of the concentration of the metal organic framework. It was demonstrated that the metal organic framework having high porosity can effectively improve the membrane permeability. Meanwhile, the salt rejection rate of TFN-2 reached 98% or more and was in the leading level of the reverse osmosis membrane reported at present. It was demonstrated that the introduction of CuBTTri can effectively improve the separating property of the thin-film composite polyamide membrane.

Embodiment 5

Figure 4:
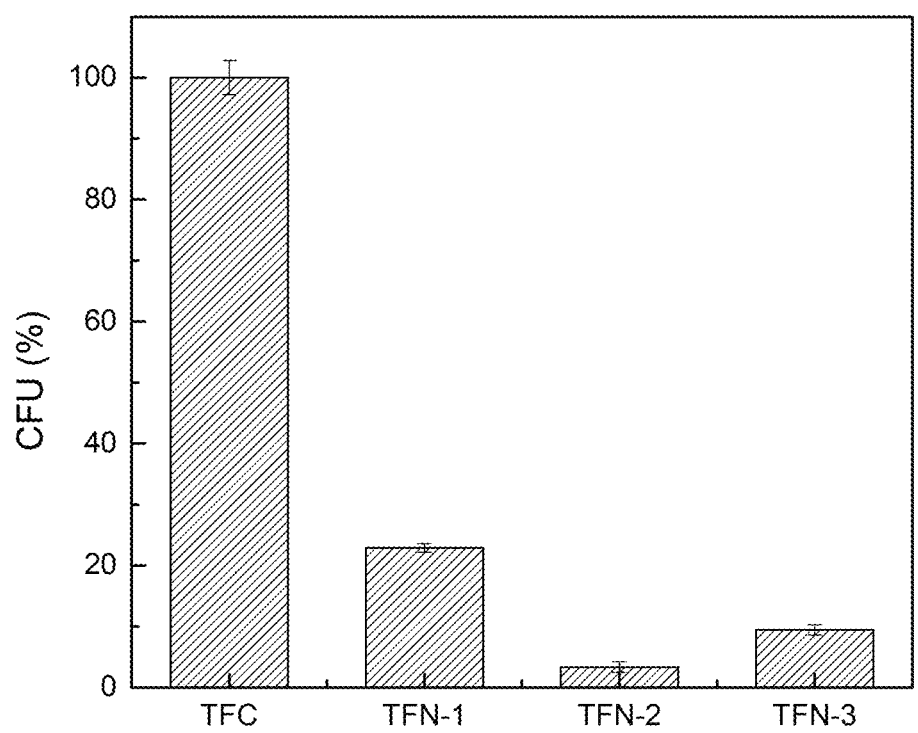
FIG. 4 is a graph showing the results measured by counting the colony forming units (CFU) after *Pseudomonas aeruginosa* is in contact with the membranes TFC, TFN-1, TFN-2 and TFN-3 obtained in Embodiment 1 for 24 h.

Static anti-bacterial test: the membranes prepared in Embodiment 1 were measured for the anti-bacterial properties against *Pseudomonas aeruginosa* by using a CFU counting method. The operation was as follows: the membranes TFC, TFN-1, TFN-2 and TFN-3 obtained in Embodiment 1 were washed with a phosphate buffer solution and irradiated under an ultraviolet lamp for 30 min for sterilization. The membranes were immersed in 1 mL suspension of *Pseudomonas aeruginosa* (10$^6$ CFU/mL) for 24 h under conditions of 150 rpm and 37° C. The membranes were taken out and the bacteria adsorbed on membrane surfaces were removed by sonication using a predetermined amount of phosphate buffer solution. The bacterial suspensions were diluted, 200 μL of the bacterial suspension was distributed on a LB agar plate, and cultured at a constant temperature of 37° C. for 12 h. The CFU was counted and the result was shown in FIG. 4.

According to the test, the membranes TFN-1, TFN-2 and TFN-3 obtained in Embodiment 1 had significantly anti-bacterial properties compared with the original TFC membrane and had remarkable biocidal effects on *Pseudomonas aeruginosa*. It was demonstrated that the addition of the metal organic framework can effectively improve the antibacterial property of the membrane surface.

Embodiment 6

Figure 5:
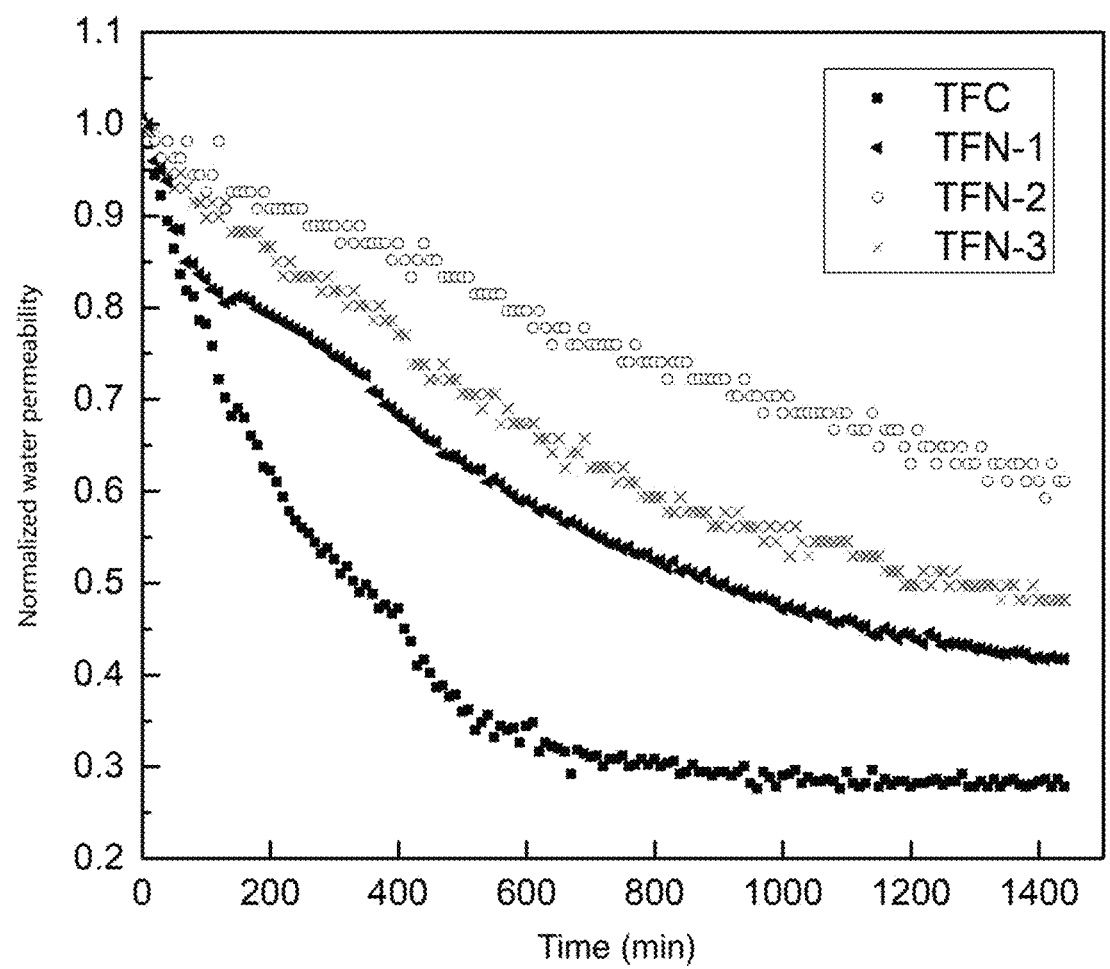
FIG. 5 is a graph showing the water flux during the process that *Pseudomonas aeruginosa* is in contact with the TFC and TFN membranes obtained in Embodiment 1 for 24 h in cross-flow filtration cell.

Dynamic anti-bacterial test: the membranes TFC, TFN-1, TFN-2 and TFN-3 obtained in Embodiment 1 were chosen respectively to carry out cross-flow filtration by a reverse osmosis cell under conditions of 1.6 MPa and 24° C. for 24 h. The effective membrane area was 20.02 cm$^2$, the cross-flow rate was 22.0 cm/s, and the feed was a Pseudomonas aeruginosa solution (6×10$^7$ CFU/L). The change of the water flux during operation was monitored, and the result was shown in FIG. 5.

As can be seen from the analysis of membrane permeability, the water flux of the TFN-1, TFN-2 and TFN-3 membranes obtained in Embodiment 1 reduced slowly compared to that of the original TFC membrane, illustrating that the TFN-1, TFN-2, TFN-3 membranes had significant anti-bacterial and anti-fouling effects.

The foregoing descriptions are merely preferred embodiments of the present invention, and all variations and modifications made according to the scope of the present invention should fall into the scope of the present invention.

What is claimed is:

1. A thin-film composite polyamide reverse osmosis membrane with anti-bacterial and anti-biofouling effects, comprising a substrate and a thin film, wherein the substrate is an ultrafiltration membrane, and the thin film is formed by loading an aromatic polyamide film containing a CuBTTri uniformly on a surface of the substrate, wherein the CuBTTri has a molecular formula of H3[(Cu$_4$Cl)$_3$-(BTTri)$_8$] and a structural formula of

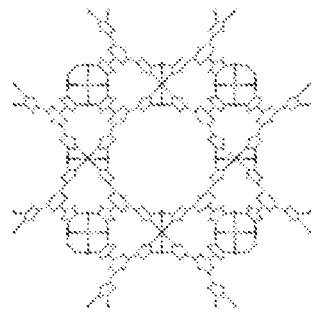

, a backbone of the CuBTTri comprises Cu$^{2+}$ and an organic ligand H$_3$BTTri, the H$_3$BTTri is 1,3,5-tri(1H-1,2,3-triazol-5-yl)benzene, and the H$_3$BTTri has a structural formula of

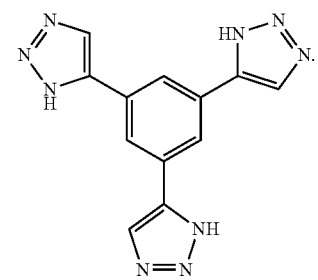 [SMILES: c1c(-c2cnn[nH]2)cc(-c2cnn[nH]2)cc1-c1cnn[nH]1]

2. The thin-film composite polyamide reverse osmosis membrane with the anti-bacterial and anti-biofouling effects of claim 1, wherein
the ultrafiltration membrane comprises at least one membrane selected from the group consisting of a polyacrylonitrile membrane, a polysulfone membrane, and a polyethersulfone membrane, and
the ultrafiltration membrane has a molecular weight cutoff of 10-20 kDa.

3. A method for preparing the thin-film composite polyamide reverse osmosis membrane with the anti-bacterial and anti-biofouling effects of claim 1, comprising the steps of:
   i) synthesizing the CuBTTri, comprising the steps in order of:
      a) dissolving $CuCl_2.2H_2O$ in a first organic solvent to obtain a copper chloride solution having a mass concentration of 3.8%-5.7%;
      b) dissolving the $H_3BTTri$ in a second organic solvent to obtain a first solution, and adding HCl dropwise to the first solution to acidify to pH 3.0-4.5, to obtain a triazole solution having a mass concentration of 0.5%-1%;
      c) mixing the copper chloride solution prepared in step a) and the triazole solution prepared in step b) in a volume ratio of 1:(2-3) at 70-100° C. to react for 48-96 h to obtain a resultant; and
      d) centrifuging the resultant obtained in step c) at 7500-8500 rpm for 5-10 min to obtain a purple precipitate, and vacuum drying the purple precipitate for 12-24 h to obtain the CuBTTri;
   ii) preparing an aqueous solution of m-phenylene diamine having a mass concentration of 1.5%-2.5%;
   iii) ultrasonic dispersing the CuBTTri obtained in step i) in a trimesoyl chloride-n-hexane solution having a mass concentration of 0.1%-0.15%, to obtain an n-hexane solution of CuBTTri having a mass concentration of 0.05%-0.2%;
   iv) first immersing the ultrafiltration membrane in the aqueous solution of m-phenylene diamine obtained in step ii) to react for 1-2 min and taking out the ultrafiltration membrane, and removing the aqueous solution of m-phenylene diamine on a surface of the ultrafiltration membrane; and then immersing the ultrafiltration membrane in the n-hexane solution of CuBTTri obtained in step iii) to react for 30-60 s to form the thin film on the surface of the ultrafiltration membrane, and removing unreacted trimesoyl chloride on the surface of the ultrafiltration membrane to obtain the thin-film composite polyamide reverse osmosis membrane; and
   v) heat-treating the thin-film composite polyamide reverse osmosis membrane obtained in step iv) at 50-80° C., and then immersing the thin-film composite polyamide reverse osmosis membrane in deionized water at 4° C.

4. The method for preparing the thin-film composite polyamide reverse osmosis membrane with the anti-bacterial and anti-biofouling effects of claim 3, wherein the first organic solvent and the second organic solvent in step i) are identical solvents selected from the group consisting of N,N-dimethylformamide, tetrahydrofuran and N-methyl pyrrolidone.

5. The method for preparing the thin-film composite polyamide reverse osmosis membrane with the anti-bacterial and anti-biofouling effects of claim 3, wherein an immersion manner of immersing the ultrafiltration membrane in step iv) is a full immersion and the surface of the ultrafiltration membrane is oriented upward.

6. The method for preparing the thin-film composite polyamide reverse osmosis membrane with the anti-bacterial and anti-biofouling effects of claim 3, wherein the ultrafiltration membrane comprises at least one of a polyacrylonitrile membrane, a polysulfone membrane and a polyethersulfone membrane, and the ultrafiltration membrane has a molecular weight cutoff of 10-20 kDa.

7. The method for preparing the thin-film composite polyamide reverse osmosis membrane with the anti-bacterial and anti-biofouling effects of claim 6, wherein the first organic solvent and the second organic solvent in step i) are identical solvents or each solvent is selected from the group consisting of N,N-dimethylformamide, tetrahydrofuran and N-methyl pyrrolidone.

8. The method for preparing the thin-film composite polyamide reverse osmosis membrane with the anti-bacterial and anti-biofouling effects of claim 6, wherein an immersion manner of immersing the ultrafiltration membrane in step iv) is a full immersion and the surface of the ultrafiltration membrane is oriented upward.

9. A method of using the thin-film composite polyamide reverse osmosis membrane with the anti-bacterial and anti-biofouling effects of claim 1, comprising using the thin-film composite polyamide reverse osmosis membrane in water treatment.

10. The method of claim 9, wherein bacteria die when in contact with the thin-film composite polyamide reverse osmosis membrane, a surface of the thin-film composite polyamide reverse osmosis membrane is uniformly loaded with the aromatic polyamide film containing the CuBTTri to achieve sterilization or bacterial growth inhibition.

11. The method of claim 9, wherein the ultrafiltration membrane comprises at least one of a polyacrylonitrile membrane, a polysulfone membrane and a polyethersulfone membrane, and the ultrafiltration membrane has a molecular weight cutoff of 10-20 kDa.

12. The method of claim 11, wherein bacteria die when in contact with the thin-film composite polyamide reverse osmosis membrane, a surface of the thin-film composite polyamide reverse osmosis membrane is uniformly loaded with the aromatic polyamide film containing the CuBTTri to achieve sterilization or bacterial growth inhibition.

* * * * *